(12) United States Patent
Ban et al.

(10) Patent No.: US 7,076,271 B2
(45) Date of Patent: Jul. 11, 2006

(54) MOBILE TERMINAL AND PROGRAM EXECUTED THEREIN

(75) Inventors: Yoichiro Ban, Nagoya (JP); Hiroaki Kuraoka, Toyota (JP)

(73) Assignee: DENSO Corporation, Kariya (JP)

( * ) Notice: Subject to any disclaimer, the term of this patent is extended or adjusted under 35 U.S.C. 154(b) by 389 days.

(21) Appl. No.: 10/053,202

(22) Filed: Jan. 15, 2002

(65) Prior Publication Data

US 2002/0147033 A1 Oct. 10, 2002

(30) Foreign Application Priority Data

Jan. 17, 2001 (JP) .............................. 2001-008883

(51) Int. Cl.
*H04B 17/00* (2006.01)
*H04Q 7/20* (2006.01)
*H04M 1/00* (2006.01)

(52) U.S. Cl. .............................. 455/556.1; 455/556.2; 455/67.11; 455/452.1; 455/402.2

(58) Field of Classification Search ............ 455/452.1, 455/452.2, 67.11, 515, 556.1, 556.2
See application file for complete search history.

(56) References Cited

U.S. PATENT DOCUMENTS

| | | | |
|---|---|---|---|
| 6,192,257 B1 | 2/2001 | Ray | |
| 6,366,654 B1 | 4/2002 | Cramer et al. | |
| 6,473,631 B1 * | 10/2002 | Siddoway et al. | 455/575.1 |
| 6,625,478 B1 * | 9/2003 | Nonogaki | 455/574 |
| 6,657,654 B1 * | 12/2003 | Narayanaswami | 455/556.2 |

2001/0055987 A1    12/2001  Tsuchida

FOREIGN PATENT DOCUMENTS

| | | |
|---|---|---|
| JP | 11-127300 | 5/1999 |
| JP | A-2000-125356 | 4/2000 |
| JP | A-2000-156812 | 6/2000 |
| JP | 2001-345899 | 12/2001 |

OTHER PUBLICATIONS

A complete translation of JP11127300, Maruyama Kenichi, May 11, 1999, JPO.*
Japanese Office Action dated Feb. 24, 2004 in corresponding Japanese Application No. 2001-008883.
Japanese Office Action dated Aug. 17, 2004 in corresponding Japanese Application No. 2001-008883 with English translation.

* cited by examiner

*Primary Examiner*—Quochien B. Vuong
*Assistant Examiner*—Yuwen Pan
(74) *Attorney, Agent, or Firm*—Harness, Dickey & Pierce, PLC

(57) ABSTRACT

A CPU of a mobile telephone can carry out both a standby operation for monitoring an incoming call addressed to the mobile telephone and an image processing operation for processing an image captured by a camera. When a camera-dedicated mode is selected, the standby operation is prohibited during an image capture operation of the camera. When the image captured by the camera is processed, negative effects of the standby operation on the process of the image captured by the camera can be avoided. In this manner, the image captured by the camera can be smoothly, appropriately processed, enhancing the operability of the mobile telephone.

18 Claims, 7 Drawing Sheets

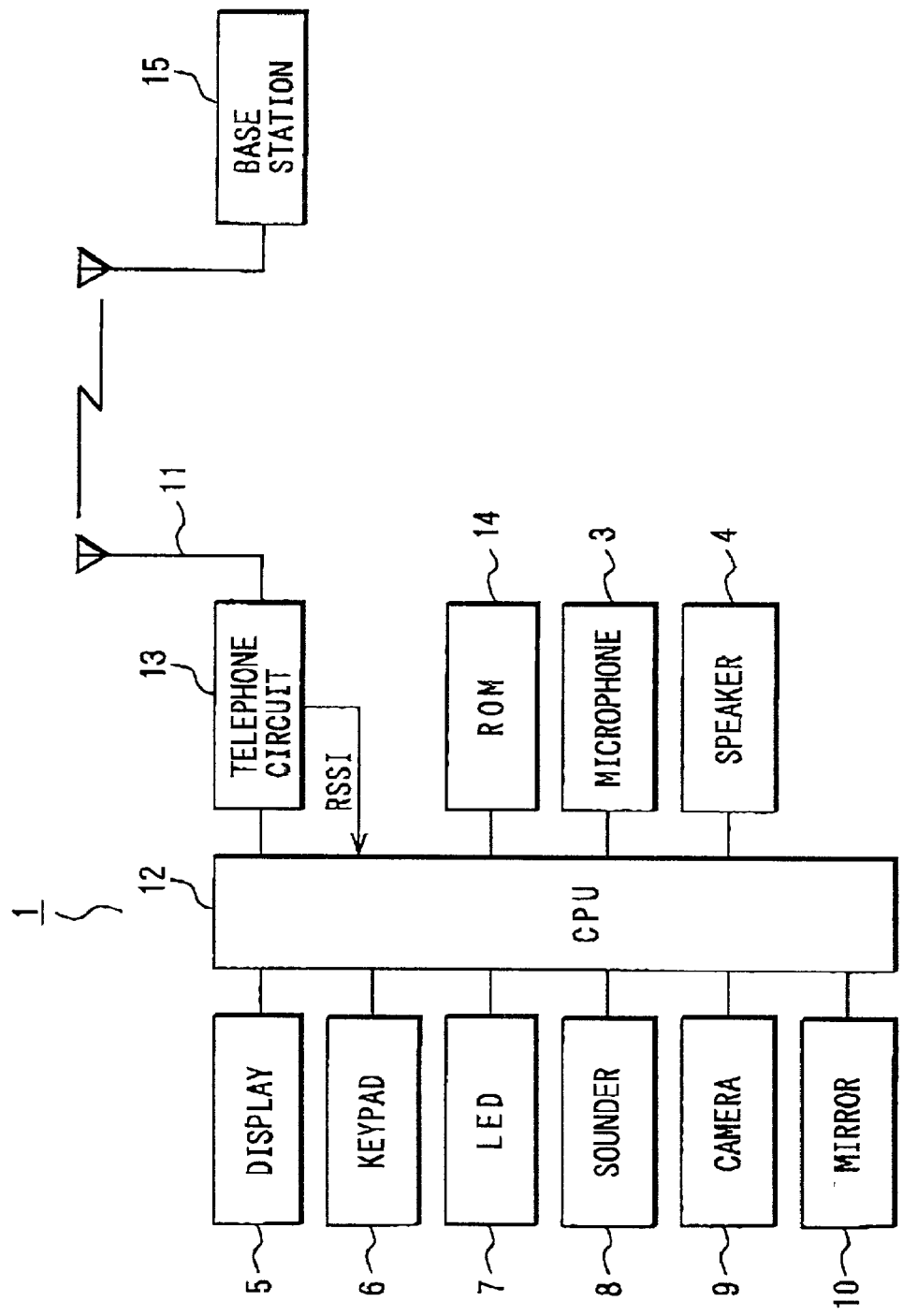

FIG. 2A
FIG. 2B
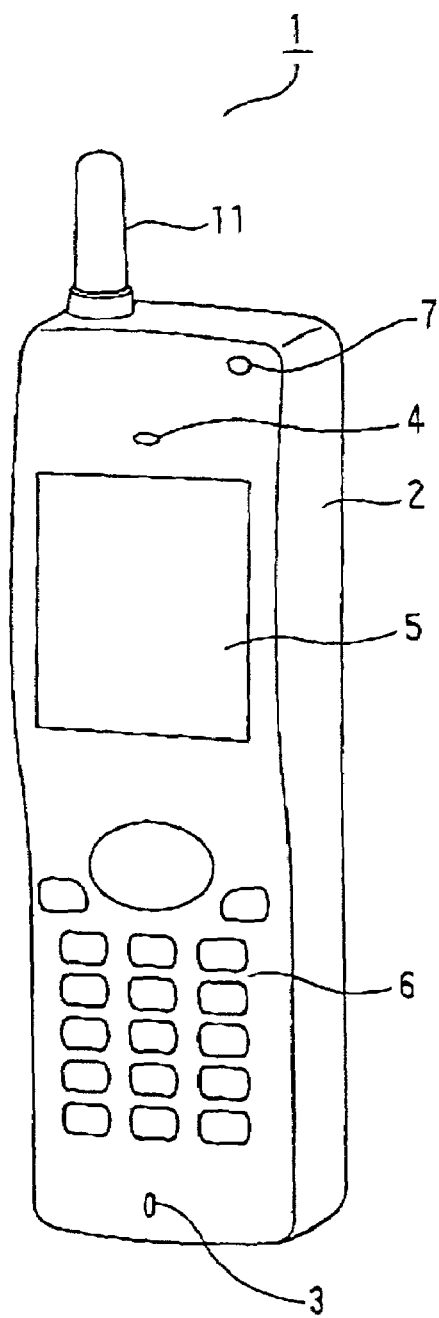
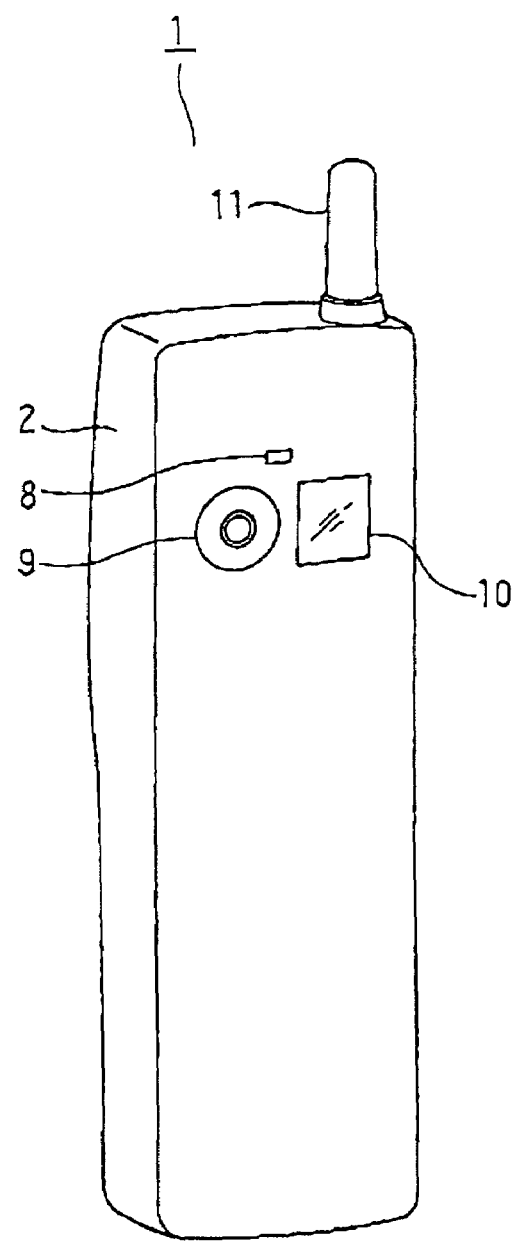

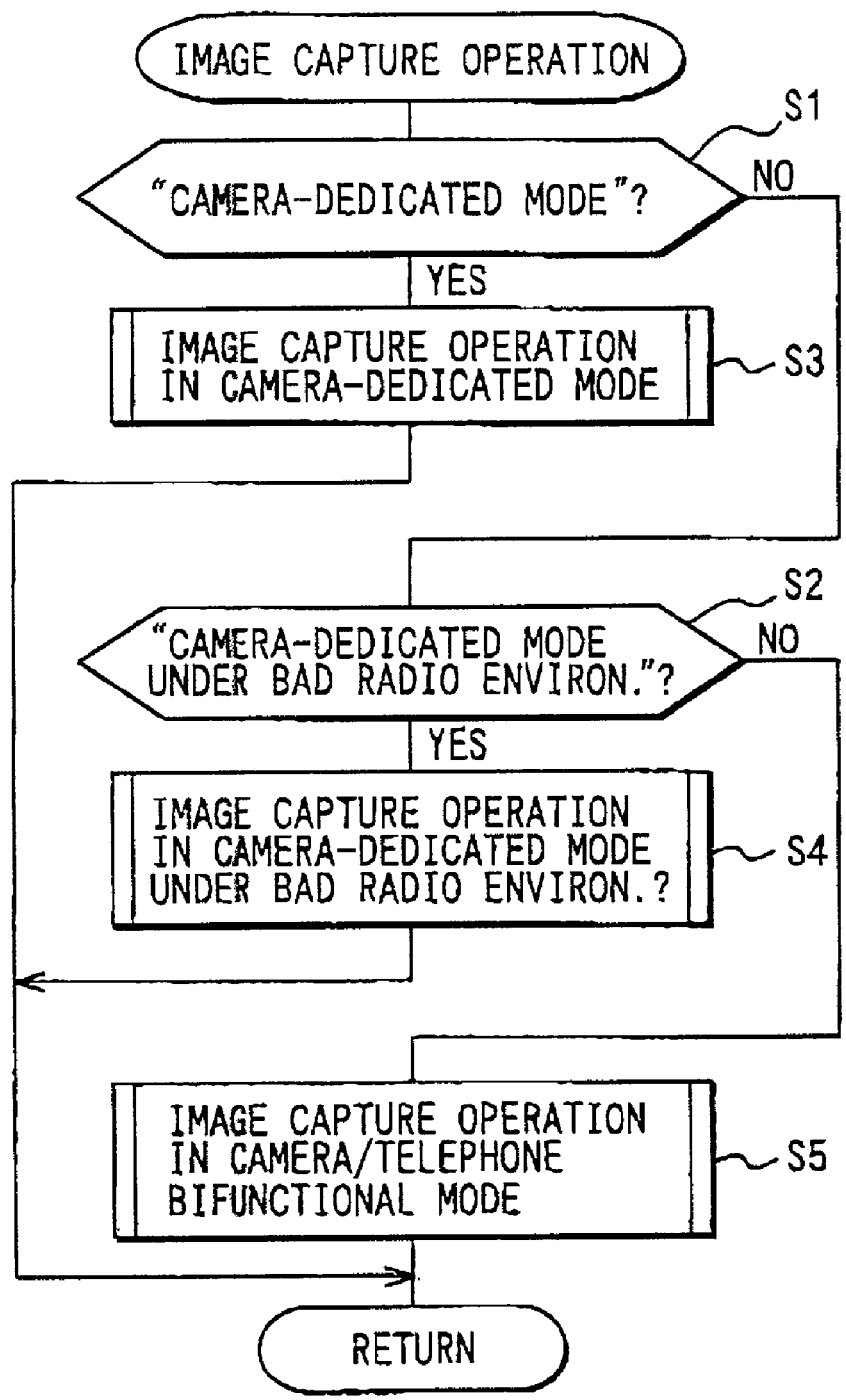

RELATIVELY GOOD RADIO ENVIRON.

RELATIVELY BAD RADIO ENVIRON.

MOBILE TERMINAL AND PROGRAM EXECUTED THEREIN

CROSS REFERENCE TO RELATED APPLICATION

This application is based on and incorporates herein by reference Japanese Patent Application No. 2001-8883 filed on Jan. 17, 2001.

BACKGROUND OF THE INVENTION

1. Field of the Invention

The present invention relates to a mobile terminal that has telephonic communication capability and includes a control means, which carries out both a standby operation for monitoring an incoming call and an image processing operation for processing an image captured by an image capture means. The present invention also relates to a program executed in such a mobile terminal.

2. Description of Related Art

A mobile telephone having a camera is known as one type of mobile terminals. Such a mobile telephone is capable of transmitting an image captured by the camera along with an e-mail message. The mobile telephone is also capable of displaying the captured image as a standby screen image or an incoming call notification screen image on its display. These features enhance the entertainment value of the mobile telephone. In order to reduce a cost of the mobile telephone, the mobile telephone can have one CPU (Central Processing Unit) that carries out both a standby operation for monitoring an incoming call and an image processing operation for processing the image captured by the camera. More specifically, as shown in FIGS. 7A and 7B, the CPU can conduct the standby operation at predetermined time intervals, which are defined by a corresponding communication standard. Furthermore, the CPU can conduct the image processing operation for processing the captured image at the time periods, during which the standby operation is not conducted.

When a state of a radio environment around the mobile telephone is relatively good, the time required for searching a paging channel becomes relatively short, and thus the time required for conducting the standby operation becomes relatively short. On the other hand, when the state of the radio environment is relatively bad, the time required for searching the paging channel becomes relatively long, and thus the time required for conducting the standby operation becomes relatively long. As a result, in the above arrangement where the one CPU carries out both the standby operation and the image processing operation, when the state of the radio environment changes from the relatively good state to the relatively bad state, the time required for the standby operation becomes relatively long. In such a case, the standby operation cannot be finished when the image processing operation needs to be started (see t1 and t2 in FIG. 7B).

In the above arrangement where the CPU cannot simultaneously carry out both the standby operation and the image processing operation, when the standby operation is not finished at the time of starting the image processing operation, the image processing operation cannot be started if priority of the standby operation is higher than that of the image processing operation. This causes removal of some image frames, causing a reduction in the number of the image frames. Thus, image capturing performance of the mobile telephone is disadvantageously reduced. Furthermore, even if the CPU is capable of simultaneously carrying out both the standby operation and the image processing operation, performance of the CPU dedicated for the image processing operation is reduced since the CPU needs to sprit its performance between the standby operation and the image processing operation. Thus, the performance of the CPU dedicated for the image processing operation is reduced, and thus the number of the image frames is reduced. This causes a reduction in the image capturing performance of the mobile telephone.

SUMMARY OF THE INVENTION

The present invention addresses the above disadvantages. Thus, it is an objective of the present invention to provide a mobile terminal that is capable of appropriately processing an image captured by an image capture means, thereby improving operability of the mobile terminal. It is another objective of the present invention to provide a program of such a mobile terminal, which enables appropriate process of the image captured by the image capture means, thereby improving the operability of the mobile terminal.

To achieve the objectives of the present invention, there is provided a mobile terminal having telephonic communication capability and including a control means. The control means carries out both a standby operation for monitoring an incoming call and an image processing operation for processing an image captured by an image capture means. The control means prohibits the standby operation during an image capture operation of the image capture means for capturing the image when a first predetermined condition is satisfied.

Furthermore, to achieve the objectives of the present invention, there is provided a program for operating a control means of a mobile terminal having telephonic communication capability. The control means carries out both as t and by operation for monitoring an incoming call and an image processing operation for processing an image captured by an image capture means. The program prohibits the standby operation during an image capture operation of the image capture means for capturing the image when a first predetermined condition is satisfied.

BRIEF DESCRIPTION OF THE DRAWINGS

The invention, together with additional objectives, features and advantages thereof, will be best understood from the following description, the appended claims and the accompanying drawings in which:

FIG. 1 is a block diagram showing an embodiment of the present invention;

FIG. 2A is a schematic front perspective view of a mobile telephone according to the embodiment;

FIG. 2B is a schematic rear perspective view of the mobile telephone shown in FIG. 2A;

FIG. 4 is a flowchart showing an image capture operation according to the embodiment;

DETAILED DESCRIPTION OF THE INVENTION

Figure 3A:
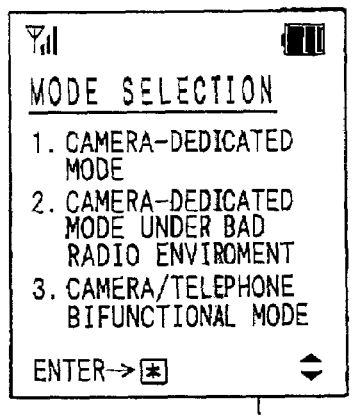
FIG. 3A is a diagram showing one exemplary menu displayed on a display of the mobile telephone.

A mobile telephone (mobile terminal having telephonic communication capability) according to an embodiment of the present invention will be described with reference to FIGS. 1 to 6.

With reference to FIGS. 2A and 2B, the mobile telephone 1 has a main body 2. A microphone 3 for inputting outgoing voice audio, a speaker 4 for outputting incoming voice audio, a display 5 (notification means of the present invention), a key pad 6 and an LED (Light Emitting Diode) 7 for notifying an incoming call by flashing are arranged at a front side of the main body 2, as shown in FIG 2A. The key pad 6 has various keys. These keys include a "CALL START" key, a "CALL END" key, a "REDIAL" key, scroll keys, numeral keys including "0 "–"9" keys and the others.

A sounder 8 for outputting a ringer sound (including a ringer melody), a camera 9 (image capture means of the present invention) and a mirror 10 are arranged at a rear side of the main body 2, as shown in FIG. 2B. An antenna 11 is arranged at a top side of the main body 2. The camera 9 includes a CMOS (complementary Metal Oxide Semiconductor) image sensor.

When a user of the mobile telephone 1 wants to capture an image of a target object other than the user himself, the user holds the mobile telephone 1, for example, with his hand and directs the camera 9 toward the target object, so that the image of the target object is displayed on the display 5. This allows the user to check the image of the target object to be captured by the camera 9. Alternatively, if the user wants to include himself as part of his target object to be captured by the camera 9, the user directs the camera 9 of the mobile telephone 1 toward himself, so that the image of the user to be captured by the camera 9 is displayed on the mirror 10. This allows the user to check the image of the target to be captured by the camera 9.

With reference to FIG. 1, in the mobile telephone 1, a CPU 12 (acting as a radio environment measurement means and also a control means of the present invention), which includes a microcomputer, is electrically connected to a telephone circuit 13 for conducting a telephone operation, a ROM (Read Only Memory) 14 that stores a control program (program of the present invention), the microphone 3, the speaker 4, the display 5, the keypad 6, the LED 7, the sounder 8, the camera 9 and the mirror 10.

Once the mobile telephone 1 is powered or activated, the CPU 12 conducts a standby operation at predetermined time intervals, which are defined by a corresponding communication standard. Furthermore, when the CPU 12 detects activation of an image capture key on the keypad 6, the CPU 12 conducts an image processing operation for processing the image captured by the camera 9 at the time periods, during which the standby operation is not conducted.

In the standby operation, the CPU 12 monitors whether an incoming call addressed to the mobile telephone 1 is present by searching a paging channel of the incoming radio signal, which is transmitted from the base station 15 and is received by the telephone circuit 13. If the incoming call addressed to the mobile telephone 1 is detected, the CPU 12 outputs a flash initiation command to the LED 7 to initiate flashing of green light from the LED 7 and also outputs an output initiation command to the sounder 8 to initiate output of the ringer sound from the sounder 8. Furthermore, if a caller telephone number is transmitted from the base station 15, the CPU 12 outputs a display initiation command to the display 15 to initiate the display of the caller telephone number transmitted from the base station 15.

The telephone circuit 13 outputs an RSSI (Received Signal Strength Indicator) output to the CPU 12. The RSSI output indicates a strength of the signal received from the base station 15. When the CPU 12 receives the RSSI output from the telephone circuit 13, the CPU 12 determines a current state of the radio environment by analyzing the RSSI output.

Next, the operation of the above arrangement will be described with reference to FIGS. 3 to 6 in conjunction with FIGS. 1 and 2. First when the CPU 12 detects that the keypad 6 is operated to select an operation mode from "a camera-dedicated mode", "a camera-dedicated mode under a bad radio environment" and "a camera/telephone bifunctional mode" while "a mode selection menu", such as one shown in FIG. 3A, is displayed on the display 5, the CPU 12 sets a corresponding one of "the camera-dedicated mode", "the camera-dedicated mode under the bad radio environment" and "the camera/telephone bifunctional mode" based on the operation of the keypad 6.

Then, when the CPU 12 detects activation of the image capture key on the keypad 6 for capturing the image of the target object, the CPU 12 conducts an image capture operation shown as a flowchart in FIG. 4. In this operation, the CPU 12 first determines the current operation mode (steps S1 and S2). If the CPU 12 detects that the current operation mode is "the camera-dedicated mode", "YES" is returned at step S1, and the CPU 12 shifts the operation to the image capture operation in the camera-dedicated mode (step S3). On the other hand, it the CPU 12 detects that the current operation mode is "the camera-dedicated mode under the bad radio environment", "NO" is returned at step S1, and control moves to step S2 where "YES" is returned. Then, the CPU 12 shifts the operation to the image capture operation in "the camera-dedicated mode under the bad radio environment" (step S4). Furthermore, if the CPU 12 detects that the current operation mode is "the camera/telephone bifunctional mode", "NO" is returned at both steps S1 and S2, and the CPU 12 shifts the operation to the image capture operation in "the camera/telephone bifunctional mode" (step S5).

Among the above-described operations, the image capture operation in "the camera-dedicated mode" and the image capture operation in "the camera-dedicated mode under the bad radio environment" will be described below.

(1) Image Capture Operation in "the Camera-dedicated Mode"

Figure 5:
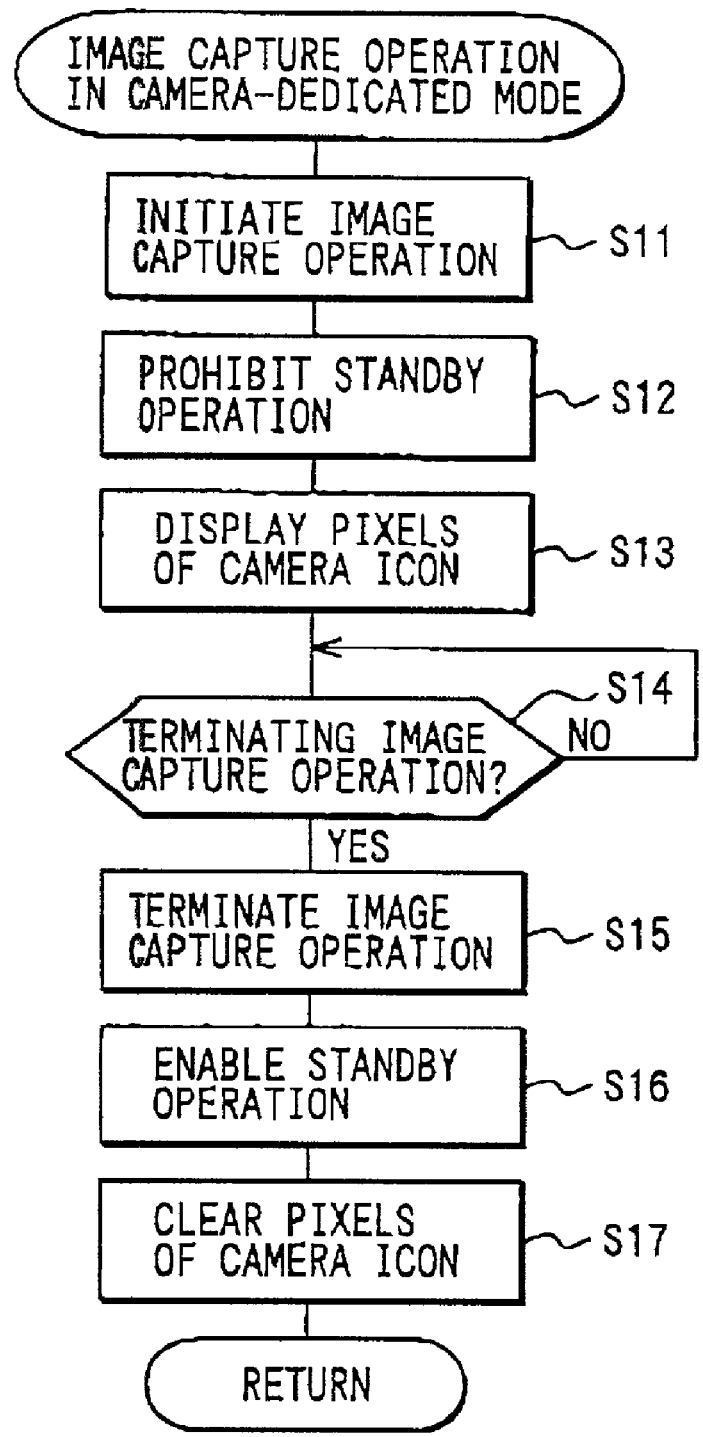
FIG. 5 is a flowchart showing an image capture operation in a camera dedicated mode according to the embodiment.

First, the image capture operation in "the camera-dedicated mode" will be described with reference to a flowchart shown in FIG. 5. When the operation is changed to initiate the image capture operation in "the camera-dedicated mode", the CPU 12 outputs an image capture command to the camera 9 to initiate the image capture operation through the camera 9 (step S11). Then, the CPU 12 prohibits the standby operation (step S12) and outputs a display command to the display 5 to display pixels of a camera icon (indicated by "R") on the display 5, as shown in FIGS. 3C and 3E (step S13, conducting a first notification operation of the present invention).

Figure 3B:
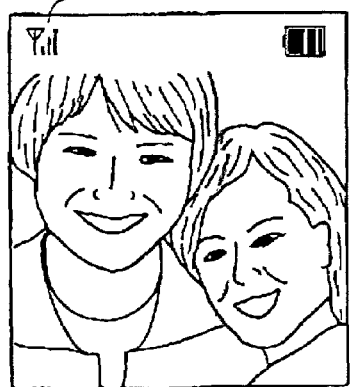
FIG. 3B is a diagram showing an exemplary image displayed on the display of the mobile telephone.
Figure 3C:
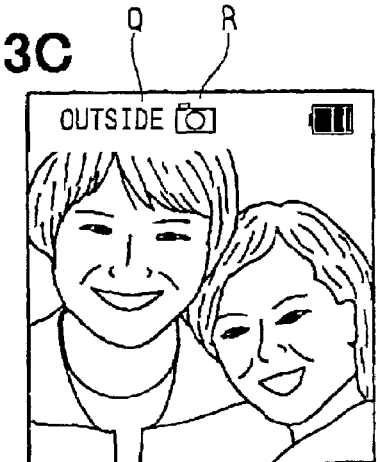
FIG. 3C is a diagram showing an exemplary image displayed on the display of the mobile telephone.
Figure 3D:
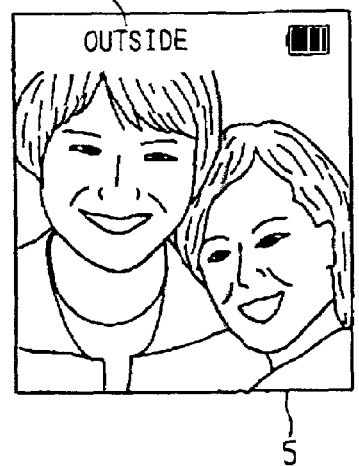
FIG. 3D is a diagram showing an exemplary image displayed on the display of the mobile telephone.
Figure 3E:
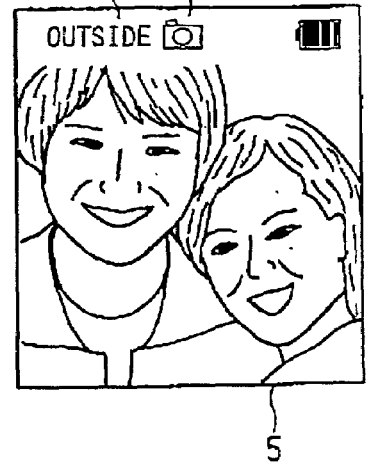
FIG. 3E is a diagram showing an exemplary image displayed on the display of the mobile telephone.

At this stage, if pixels of an antenna bar icon or of a signal strength meter icon (indicated by "P") has been displayed on the display 5 based on the current state of the radio environment, as shown in FIG. 3B, the CPU 12 clears the pixels of the antenna bar icon and displays the pixels of the camera icon and pixels of "OUTSIDE" (indicated by "Q") on the display 5, as shown in FIG. 3C. The "OUTSIDE" indicates that the mobile telephone 1 is currently outside the coverage area. Alternatively, if the pixels of "OUTSIDE" have been already displayed on the display 5 according to the current state of the radio environment, as shown in FIG. 3D, the CPU 12 also displays the pixels of the camera icon in addition to the pixels of "OUTSIDE", as shown in FIG. 3E.

Next, the CPU 12 monitors whether an image capture operation termination key on the keypad 6 has been activated to terminate the image capture operation (step S14). If the CPU 12 detects that the image capture operation termination key has been activated, "YES" is returned at step S14. Then, the CPU 12 outputs an image capture operation termination command to the camera 9 to terminate the image capture operation through the camera 9 (step S15). Next, the CPU 12 enables the standby operation (step S16) and outputs a camera icon clear command to the display 5 to clear the pixels of the camera icon on the display 5 (step S17, conducting a second notification operation of the present invention). Furthermore, the CPU 12 commands the display 5 to display the pixels of the antenna bar icon or the pixels of "OUTSIDE" depending on the current state of the radio environment.

According to the above control operation, by setting "the camera-dedicated mode" in advance, the user of the mobile telephone 1 can capture the image of the target object upon prohibiting the standby operation of the mobile telephone 1 in "the camera-dedicated mode". Furthermore, when the user recognizes the pixels of the camera icon displayed on the display 5, the user can notice that the standby operation of the mobile telephone 1 is prohibited to disable acceptance of the incoming call.

(2) Image Capture operation in "the Camera-dedicated Mode under the Bad Radio Environment"

Figure 6:
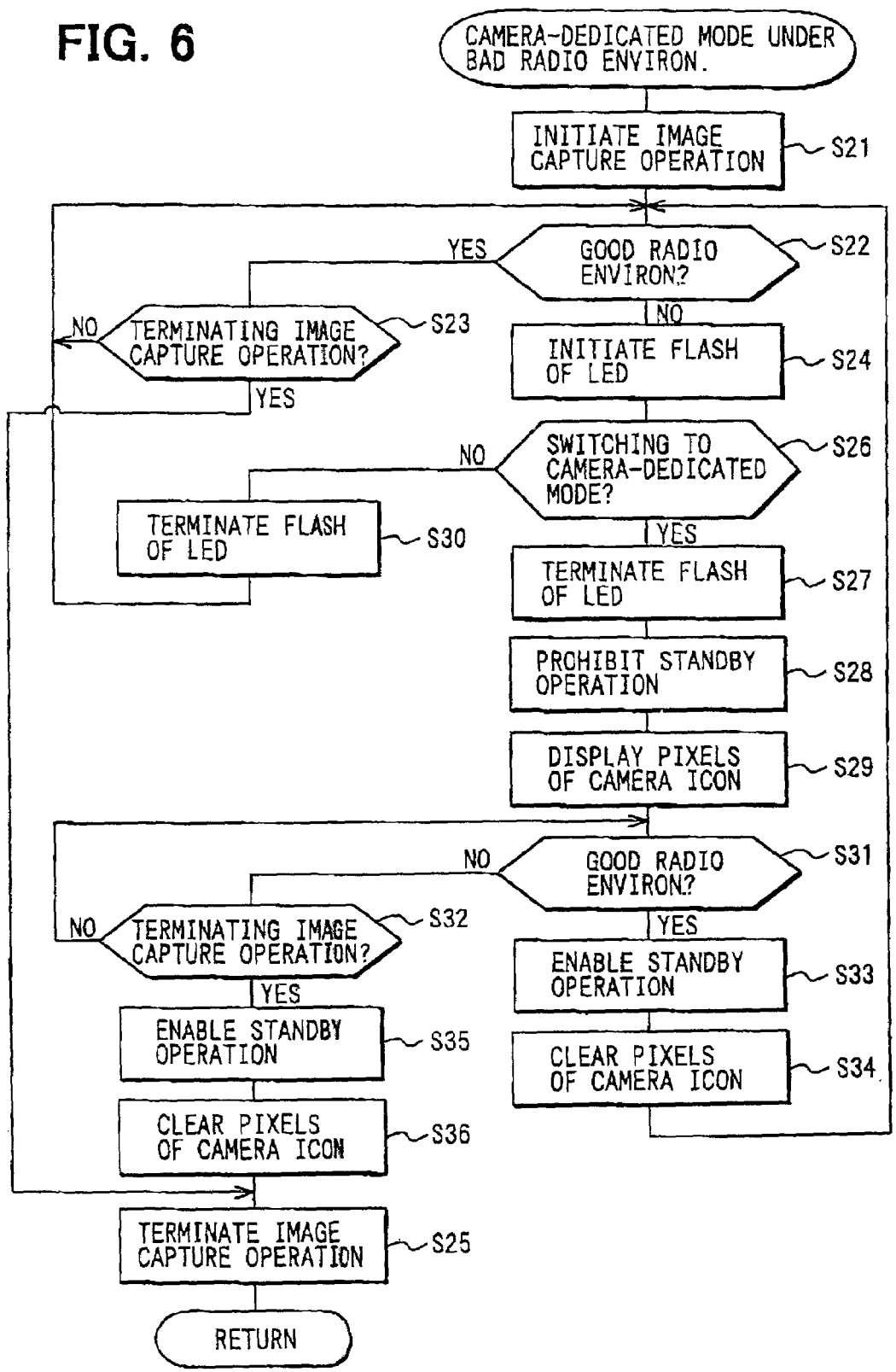
FIG. 6 is a flowchart showing an image capture operation in a camera-dedicated mode under a bad radio environment according to the embodiment.
Figure 7A:
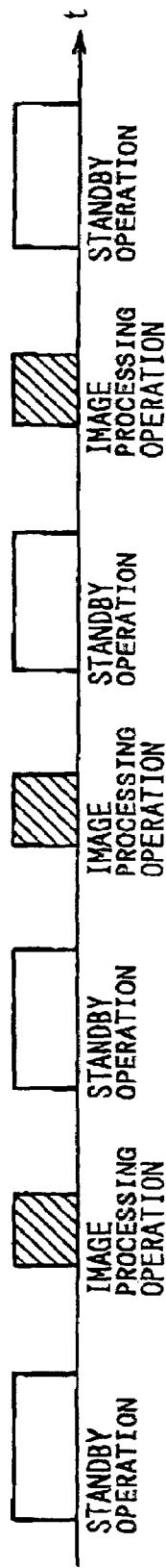
FIG. 7A is a diagram chronologically showing series of standby operations and image processing operations in a relatively good radio environment according to one previously proposed technique.
Figure 7B:
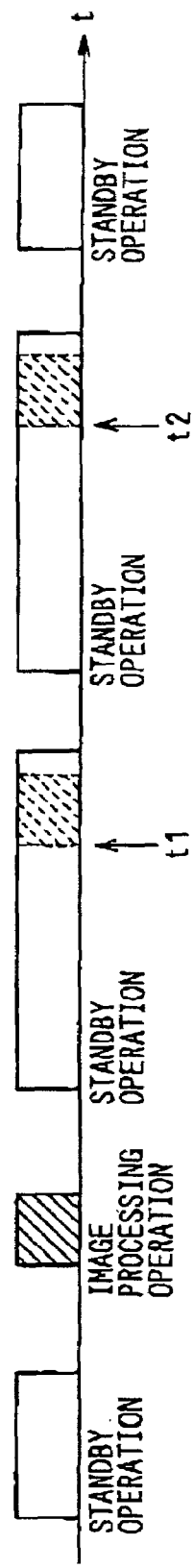
FIG. 7B is a diagram chronologically showing series of standby operations and image processing operations in a relatively bad radio environment according to the one previously proposed technique.

Next, the image capture operation in "the camera-dedicated mode under the bad radio environment" will be described with reference to a flowchart shown in FIG. 6. When the operation is changed to initiate the image capture operation in "the camera-dedicated mode under the bad radio environment", the CPU 12 outputs an image capture command to the camera 9, so that the camera 9 initiates the image capture operation (step S21). Then, the CPU 12 determines the current state of the radio environment based on the RSSI output received from the telephone circuit 13 (step S22). Furthermore, the CPU 12 monitors whether the image capture operation termination key on the keypad 6 has been activated (step S23).

When the CPU 12 detects that the received signal strength indicated with the RSSI output is less than a predetermined reference signal strength (set as a threshold value), and thus the radio environment is in a relatively bad state (i.e., when a first predetermined condition of the present invention is satisfied), "NO" is returned at step S22. Then, the CPU 12 outputs the flash initiation command to the LED 7 to initiate flashing of red light (not the green light) from the LED 7 (step S24). In this case, if the CPU 12 detects the activation of the image capture operation termination key on the keypad 6, "YES" is returned at step S23. Then, the CPU 12 outputs the image capture operation termination command to the camera 9 to terminate the image capture operation of the camera 9 (step S25), so that the image capture operation in the camera-dedicated mode under the bad radio environment is terminated.

After the CPU 12 commands the LED 7 to initiate the flashing of the red light (step S24), the CPU 12 monitors whether a camera-dedicated mode selection key for shifting the operation to the camera-dedicated mode has been activated (step S26). Then, when the CPU 12 detects the activation of the camera-dedicated mode selection key, "YES" is returned at step S26. Next, the CPU 12 outputs a flash termination command to the LED 7 to terminate the flashing of the red light from the LED 7 (step S27) and prohibits the standby operation (step S28). Furthermore, the CPU 12 outputs the display command to the display 5 to display the pixels of the camera icon on the display 5 (step S29, conducting the first notification operation of the present invention).

At this stage, if the pixels of the antenna bar icon have been displayed on the display 5 based on the current state of the radio environment, as shown in FIG. 3B, the CPU 12 clears the pixels of the antenna bar icon and displays the pixels of the camera icon and pixels of "OUTSIDE" on the display 5, as shown in FIG. 3C. Alternatively, if the pixels of "OUTSIDE" have been already displayed on the display 5 according to the current state of the radio environment, as shown in FIG. 3D, the CPU 12 also displays the pixels of the camera icon in addition to the pixels of "OUTSIDE", as shown in FIG. 3E.

Furthermore, if the CPU 12 detects that the camera-dedicated mode selection key has not been activated for more than a predetermined time period, "NO" is returned at step S26. Then, the CPU 12 outputs the flash termination command to the LED 7 to terminate the flashing of the red light from the LED 7 (step S30) and then returns to steps S22, S23.

Next, after the pixels of the camera icon are displayed on the display 5 (step S29), the CPU 12 determines the current state of the radio environment based on RSSI output received from the telephone circuit 13 (step S31). Furthermore, the CPU 12 monitors whether the image capture operation termination key on the keypad 6 has been activated to terminate the image capture operation (step S32).

At this stage, if the CPU 12 detects that the received signal strength is equal to or greater than the reference signal strength and thereby the radio environment has changed from the relatively bad state to the relatively good state (i.e., if a second predetermined condition of the present invention is satisfied), "YES" is returned at step S31. Then, the CPU 12 enables the standby operation (step S33) and outputs the camera icon clear command to the display 5 to clear the pixels of the camera icon (step S34, conducting the second notification operation of the present invention). Furthermore, the CPU 12 commands the display 5 to display the pixels of the antenna bar icon or the pixels of "OUTSIDE" depending on the current state of the radio environment.

In this case, if the CPU 12 detects the activation of the image capture operation termination key on the keypad 6, "YES" is returned at step S32. Then, the CPU 12 enables the standby operation (step S35) and outputs the camera icon clear command to the display 5 to clear the pixels of the camera icon (step S36). Furthermore, the CPU 12 commands the display 5 to display the pixels of the antenna bar icon or the pixels of "OUTSIDE" depending on the current state of the radio environment Then, the CPU 12 outputs the image capture operation termination command to the camera 9 to terminate the image capture operation of the camera 9 (step S25), so that the image capture operation in the camera-dedicated mode under the bad radio environment is terminated.

According to the above control operation, by setting "the camera-dedicated mode under the bad radio environment" in advance, the user of the mobile telephone 1 can recognize that the radio environment has changed from the relatively good state to the relatively bad state when the LED 7 initiates the flashing, then the user can conduct the image capture operation upon prohibiting the standby operation of the mobile telephone 1 by activating the camera-dedicated mode selection key. Furthermore, the user can notice that the standby operation of the mobile telephone 1 is prohibited to disable acceptance of the incoming call when the user recognizes the pixels of the camera icon displayed on the display 5. Thereafter, when the pixels of the camera icon are cleared from the display 5, the user can recognize that the radio environment has changed from the relatively bad state to the relatively good state and can also recognize that the standby operation of the mobile telephone 1 is enabled to allow the acceptance of the incoming call.

The above description is intended for the case where the user of the mobile telephone 1 does not include himself as part of his target object to be captured by the camera 9, i.e., where the user directs the camera 9 toward the target object and captures the image of the target object through the camera 9. In such a case, the display 5 is consequently directed toward the user of is the mobile telephone 1. Thus, the user can recognize that the standby operation of the mobile telephone 1 is prohibited when the user recognizes the pixels of the camera icon on the display 5, which are displayed after the selection of the "the camera-dedicated mode" or after the activation of the camera-dedicated mode selection key in the camera-dedicated mode under the bad radio environment.

As described above, the present embodiment provides the following advantages. That is, in the situation where "the camera-dedicated mode" is selected as the current mode, the standby operation of the mobile telephone 1 is prohibited during the image capture operation through the camera 9. Thus, when the image captured by the camera 9 is processed, the negative effects of the standby operation on the process of the image captured by the camera 9 can be avoided. In this manner, the image captured by the camera 9 can be smoothly, appropriately processed, enhancing the operability of the mobile telephone 1.

Alternatively, in the situation where "the camera-dedicated mode under the bad radio environment" selected as the current mode, when the radio environment changes from the relatively good state to the relatively bad state during the image capture operation through the camera 9, the LED 7 initiates the flashing. At this stage, if the camera-dedicated mode selection key is activated, the standby operation of the mobile telephone 1 is prohibited. Thus, in this case, when the image captured by the camera 9 is processed, the negative effects of the standby operation on the process of the image captured by the camera 9 can be avoided. In this manner, the image captured by the camera 9 can be smoothly, appropriately processed. Furthermore, when the radio environment changes from the relatively bad state to the relatively good state, the standby operation is automatically enabled. Thus, the image captured by the camera 9 can be smoothly, appropriately processed, and it is possible to detect the incoming call addressed to the mobile telephone 1, allowing acceptance of the incoming call.

Furthermore, when the standby operation is prohibited, the pixels of the camera icon are displayed on the display 5. Thus, when the user of the mobile telephone 1 recognizes the pixels of the camera icon displayed on the display 5, the user can recognize that the standby operation of the mobile telephone 1 is prohibited, and thus the acceptance of the incoming call is disallowed. Furthermore, when the standby operation of the mobile telephone 1 is enabled, the pixels of the camera icon are cleared from the display 5. Thus,when the user of the mobile telephone 1 recognizes the cleared state of the pixels of the camera icon on the display 5, the user can recognize that the standby operation of the mobile telephone 1 is enabled, and thus the acceptance of the incoming call is allowed.

Furthermore, in this case, the pixels of "OUTSIDE" are displayed on the display 5 in addition to the pixels of the camera icon. Thus, the user of the mobile telephone 1 can recognize that the standby operation is prohibited, and thus the acceptance of the incoming call is disallowed under the above-described circumstance which is different from the normal situation where the pixels of "OUTSIDE" are displayed on the display 5 when the mobile telephone 1 cannot receive the signal or is placed in the bad radio environment.

It should be understood that the present invention is not limited to the above embodiment, and the above embodiment can be changed or modified in the following manner.

The mobile terminal is not limited to the mobile telephone and can be a personal digital assistant (PDA) or the like. Furthermore, the camera is not necessarily placed on the opposite side of the main body of the mobile telephone, which is opposite to the side of the main body where the display and the keypad are arranged. That is, the camera can be placed on the side of the main body where the display and the keypad are arranged. Furthermore, it is not necessary to integrate the camera into the main body of the mobile telephone. For example, the camera can be detachably connected to the main body of the mobile telephone through an interface provided in the mobile telephone for connecting between the mobile telephone and the camera.

In the situation where the camera-dedicated mode under the bad radio environment is selected, when the radio environment changes from the relatively good state to the relatively bad state, the standby operation can be automatically prohibited without requiring the activation of the camera-dedicated mode selection key. Furthermore, when the radio environment involved in the standby operation changes from the relatively bad state to the relatively good state, the LED can flash light of a color other than the green or red to notify the change of the radio environment to the user of the mobile telephone. Then, when the keypad is operated to change the operation to the camera/telephone bifunctional mode, the standby operation can be enabled.

The first notification operation is not limited to the display of the pixels of the camera icon on the display. For example, the first notification operation can be a flashing operation or continuous lighting operation of the LED, a display operation of a predetermined message on the display, the output operation of predetermined sound or predetermined sound message from the sounder or a combination of these operations. Furthermore, another LED can be placed on the side of the main body of the mobile telephone where the camera is arranged. This LED can be flashed when the standby operation of the mobile telephone 1 is prohibited by the selection of "the camera-dedicated mode" or by the activation of the camera-dedicated mode selection key after the selection of "the camera-dedicated mode under the bad radio environment". With the above arrangement, even if the user directs the camera toward himself, the user can recognize that the standby operation of the mobile telephone 1 is prohibited when the user recognizes the flashing of this LED, which is activated after the selection of the "the camera-dedicated mode" or after the activation of the camera-dedicated mode selection key in the camera-dedicated mode under the bad radio environment.

The first notification operation can be varied in a continuous manner or in a stepwise manner based on duration time of the relatively bad radio environment. For example, when the duration time of the relatively bad radio environment exceeds a predetermined time period, the camera icon can be changed from one form to another form (or among various forms) to notify the duration of the bad radio environment beyond the predetermined time period to the user of the mobile telephone.

The control program is not necessarily stored in the ROM by the time of shipment of the mobile telephone. For example, the control program can be downloaded to the mobile telephone through a communication network and can be installed in the mobile telephone upon activation of a predetermined key.

Additional advantages and modifications will readily occur to those skilled in the art. The invention in its broader terms is therefore, not limited to the specific details, representative apparatus, and illustrative examples shown and described.

What is claimed is:

1. A mobile terminal having telephonic communication capability, comprising:
    control means for carrying out a standby operation for monitoring an incoming call and an image processing operation for processing an image captured by a camera, and
    notification means for conducting a first notification operation, wherein
    the control means prohibits the standby operation during an image capture operation of the camera for capturing the image when a camera-dedicated mode is selected by a user,
    the control means allows the standby operation during the image capture operation of the camera for capturing the image when a bifunctional mode is selected by a user,
    the control means includes a single CPU, which carries out the standby operation for monitoring the incoming call and the image processing operation for processing the image captured by the camera,
    the control means commands the notification means to carry out the first notification operation when the standby operation is prohibited, and
    the first notification operation includes clearing of a display of an antenna bar on the notification means.

2. A mobile terminal according to claim 1, further comprising radio environment measuring means for measuring a state of a radio environment that is involved in the standby operation,
    wherein the control means prohibits the standby operation during the image capture operation when the radio environment measuring means detects that the radio environment involved in the standby operation is in a relatively bad state.

3. A mobile terminal according to claim 1, wherein the control means enables the standby operation when a second predetermined condition is satisfied in a situation where the standby operation has been prohibited.

4. A mobile terminal according to claim 3, wherein the second predetermined condition is satisfied when the radio environment measuring means detects a change in the state of the radio environment involved in the standby operation from the relatively bad state to a relatively good state.

5. A mobile terminal according to claim 3, wherein the control means commands the notification means to carry out a second notification operation when the standby operation is enabled.

6. The mobile terminal according to claim 1, wherein the control means terminates the prohibition of the standby operation and thereby allows the standby operation when the control means detects that an operation for terminating the image capture operation is performed in the camera-dedicated mode.

7. The mobile terminal according to claim 6, wherein the control means commands the notification means to redisplay the antenna bar on the notification means when the standby operation is allowed after the prohibition of the standby operation.

8. A program for operating control means of a mobile terminal having image capturing capability and telephonic communication capability, wherein the control means carries out a standby operation for monitoring an incoming call and an image processing operation for processing an image captured by a camera, wherein
    the program prohibits the standby operation during an image capture operation of the camera for capturing the image when a camera-dedicated mode is selected by a user,
    the program allows the standby operation during the image capture operation of the camera for capturing the image when a bifunctional mode is selected by a user,
    the control means includes a single CPU, which carries out the standby operation for monitoring the incoming call and the image processing operation for processing the image captured by the camera,
    the program commands notification means of the mobile terminal to carry out a first notification operation when the standby operation is prohibited, and
    the first notification operation includes clearing of a display of an antenna bar on the notification means.

9. The program according to claim 8, wherein the program terminates the prohibition of the standby operation and thereby allows the standby operation when it is detected that an operation for terminating the image capture operation is performed in the camera-dedicated mode.

10. The program according to claim 9, wherein the program commands the notification means to redisplay the antenna bar on the notification means when the standby operation is allowed after the prohibition of the standby operation.

11. A mobile terminal having telephonic communication capability, comprising:
    control means for carrying out a standby operation for monitoring an incoming call and an image processing operation for processing an image captured by a camera, and
    notification means for conducting a first notification operation, wherein
    the mobile terminal has a camera-dedicated mode, in which an image capture operation through the camera is allowed while the standby operation is prohibited, the mobile terminal operates in only the camera-dedicated mode when the camera-dedicated mode is selected by a user, the control means includes a single CPU, which carries out the standby operation for monitoring the incoming call and the image processing operation for processing the image captured by the cameras, the control means commands the notification means to carry out the first notification operation when the standby operation is prohibited, and the first notification operation includes clearing of a display of an antenna bar on the notification means.

12. A mobile terminal according to claim 11, wherein the mobile terminal has a bifunctional mode in which the image capture operation through the camera and the standby operation are allowed, and the mobile terminal operates in the bifunctional mode when the bifunctional mode is selected by a user.

13. The mobile terminal according to claim 11, wherein the control means terminates the prohibition of the standby operation and thereby allows the standby operation when the control means detects that an operation for terminating the image capture operation is performed in the camera-dedicated mode.

14. The mobile terminal according to claim 13, wherein the control means commands the notification means to redisplay the antenna bar on the notification means when the standby operation is allowed after the prohibition of the standby operation.

15. A mobile terminal comprising:

a receiver that receives an incoming call;

a camera that captures an image;

a standby operation part that monitors the incoming call;

a controller that controls an operational mode that has a camera-dedicated mode and a bifunctional mode;

a display that shows a mode selection menu so that the operational mode can be selected by a user; and notification means for conducting a first notification operation, wherein the controller inhibits the standby operation part from monitoring the incoming call and allows the camera to capture the image while in the camera-dedicated mode, the controller allows the standby operation part to monitor the incoming call and allows the camera to capture the image while in the bifunctional mode, the controller sets the camera-dedicated mode as the operational mode when the camera-dedicated mode is selected by the user, and the controller sets the bifunctional mode as the operational mode when the bifunctional mode is selected by the user, the controller includes a single CPU, which functions as the image processor and the standby operation part, the controller commands the notification means to carry out the first notification operation when the standby operation is inhibited, and the first notification operation includes clearing of a display of an antenna bar on the notification means.

16. The mobile terminal according to claim 15, wherein the receiver receives the incoming call through a wireless communication.

17. The mobile terminal according to claim 15, wherein the controller terminates the inhibition of the standby operation part and thereby allows the standby operation part to monitor the incoming call when the controller detects that an operation for terminating the capturing of the image through the camera is performed in the camera-dedicated mode.

18. The mobile terminal according to claim 17, wherein the controller commands the notification means to redisplay the antenna bar on the notification means when the standby operation is allowed after the prohibition of the standby operation.

* * * * *